US005283424A

United States Patent [19]

Acquaviva et al.

[11] Patent Number: 5,283,424
[45] Date of Patent: Feb. 1, 1994

[54] OPTICAL PAPER SENSOR HAVING ALTERABLE SENSITIVITY AND ILLUMINATION INTENSITY

[75] Inventors: Thomas Acquaviva, Penfield; Ronald R. Wierszewski, Henrietta, both of N.Y.

[73] Assignee: Xerox Corporation, Stamford, Conn.

[21] Appl. No.: 962,552

[22] Filed: Oct. 19, 1992

[51] Int. Cl.$^5$ ................................................ G01J 1/32
[52] U.S. Cl. .................................. 250/205; 250/223 R
[58] Field of Search .................... 250/561, 559, 223 R, 250/205; 271/259, 258; 340/674–676

[56] References Cited

U.S. PATENT DOCUMENTS

| | | | |
|---|---|---|---|
| 3,789,215 | 1/1974 | Penny | 250/206 |
| 3,836,248 | 9/1974 | John, Jr. | 355/50 |
| 4,046,469 | 9/1977 | Frank et al. | 355/13 |
| 4,097,731 | 6/1978 | Krause et al. | 250/205 |
| 4,097,732 | 6/1978 | Krause et al. | 250/205 |
| 4,310,153 | 1/1982 | Kikuchi | 271/259 |
| 4,365,151 | 12/1982 | Fasig et al. | 250/223 R |
| 4,520,270 | 5/1985 | Enter et al. | 250/560 |
| 4,577,096 | 3/1986 | Beery et al. | 250/205 |
| 4,670,647 | 6/1987 | Hubble III et al. | 250/214 |
| 4,737,627 | 4/1988 | Hughes et al. | 250/223 R |
| 4,740,686 | 4/1988 | Nusser | 250/214 R |
| 4,778,986 | 10/1988 | Lundberg | 250/223 R |
| 4,818,132 | 4/1989 | Brull et al. | 400/708 |
| 4,937,441 | 6/1990 | Ishizawa et al. | 250/205 |
| 4,983,854 | 1/1991 | Mizuno et al. | 250/561 |
| 5,008,532 | 4/1991 | Ono et al. | 250/222.1 |
| 5,036,190 | 7/1991 | Lile et al. | 250/223 R |
| 5,091,627 | 2/1992 | Kimura | 250/205 |
| 5,105,078 | 4/1992 | Nochise et al. | 250/223 R |
| 5,139,339 | 8/1992 | Courtney et al. | 250/561 |
| 5,214,271 | 5/1993 | Rogers et al. | 250/561 |

OTHER PUBLICATIONS

"Document Sensor", Chambers, Xerox Disclosure Journal, vol. 7, No. 1, Jan./Feb. 1982, pp. 43–45.
"Paper Edge Sensor", Perkins, IBM Technical Disclosure Bulletin, vol. 23, No. 7A, Dec. 1980, pp. 2695–2696.
"Optical Sensor Output Amplifier", Ackerman et al, IBM Technical Disclosure Bulletin, vol. 24, No. 3, Aug. 1981, pp. 1358–1359.

Primary Examiner—Michael Messinger
Attorney, Agent, or Firm—Duane C. Basch

[57] ABSTRACT

The present invention is a method and apparatus for selectively altering the sensitivity of an optical sensor. The sensor has both a light source and a detector which are optically aligned with one another. The detector produces a first output signal level in response to light having an illumination intensity greater than or equal to a threshold intensity, and a second output signal level in response to light having an illumination intensity less than a threshold intensity. The sensor further includes the ability to selectively alter the illumination intensity of the light emitted by the light source to a lower level between the threshold intensity and the normal operating intensity. Hence, operating at the lower intensity enables the sensor to detect translucent sheets or facilitates identification of marginally operable sensors.

23 Claims, 4 Drawing Sheets

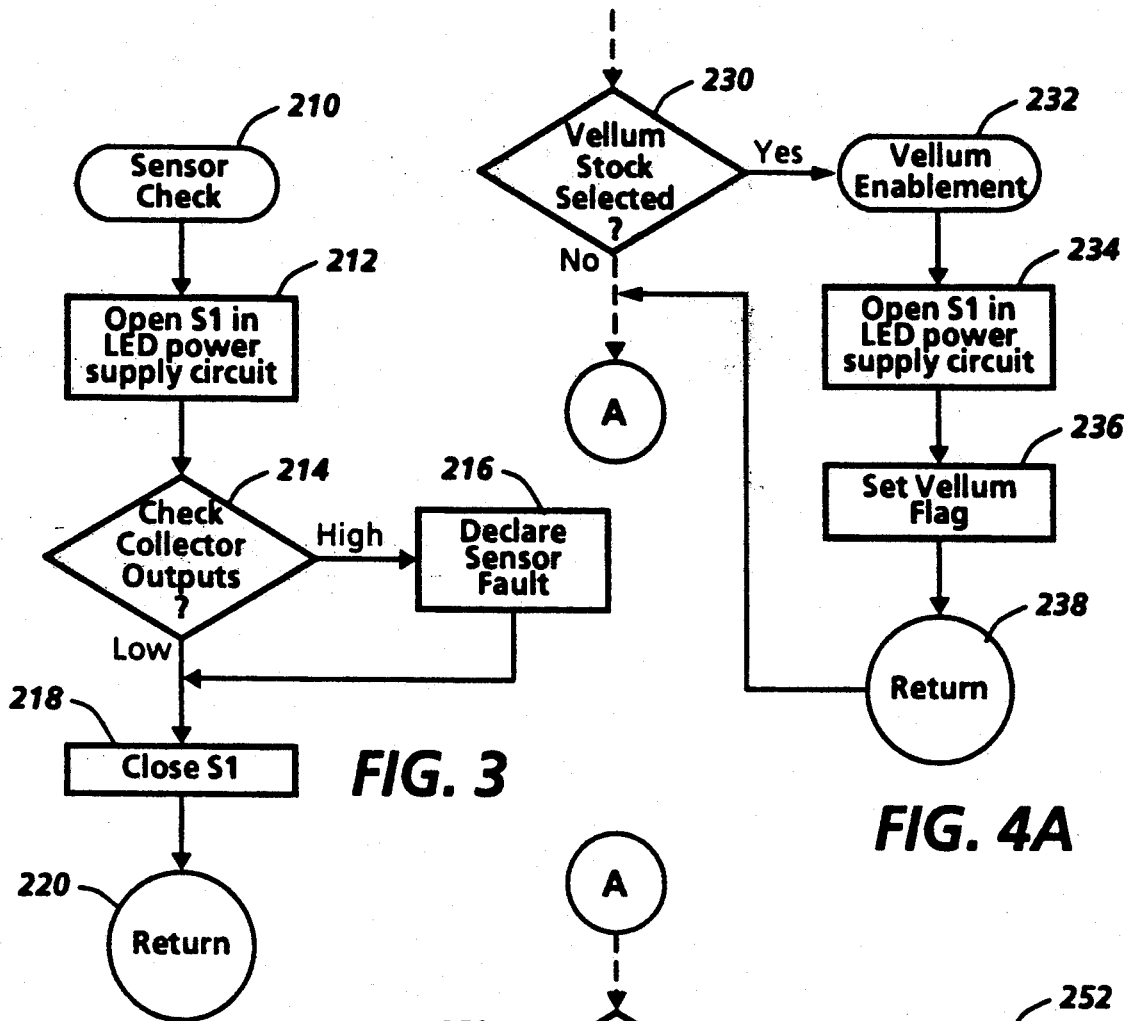
FIG. 3
FIG. 4A
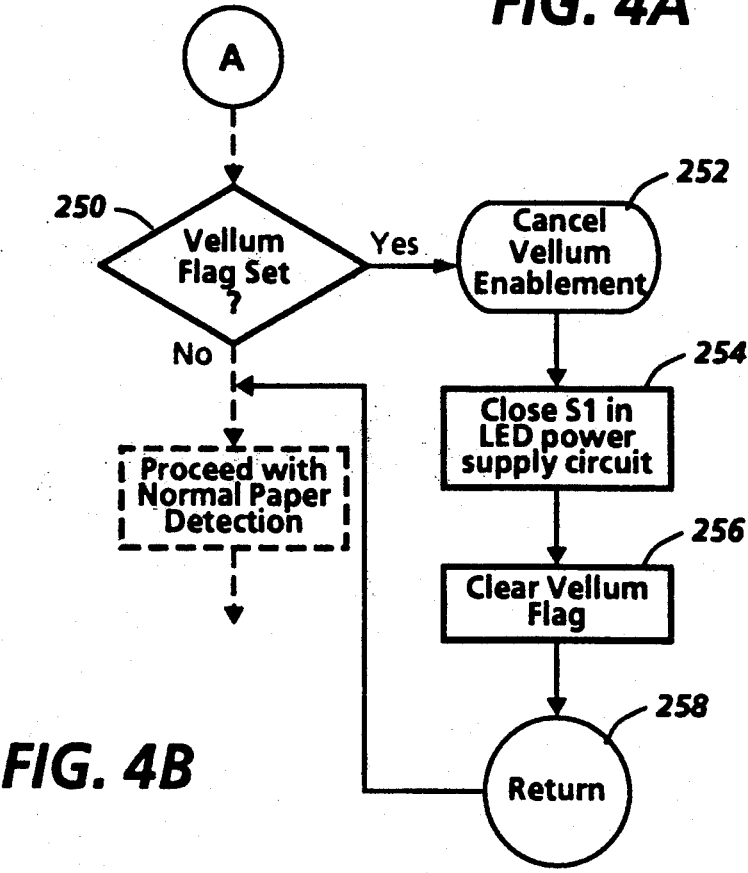
FIG. 4B

OPTICAL PAPER SENSOR HAVING ALTERABLE SENSITIVITY AND ILLUMINATION INTENSITY

This invention relates generally to a method and apparatus for sensing a copy or document sheet as it travels in a paper path, and more particularly to a system for altering the sensitivity of an optical sensor to enable testing for sensor degradation or sensing of translucent paper stock.

BACKGROUND AND SUMMARY OF THE INVENTION

Optical or photoresponsive sensors are often used in applications to determine the presence of a copy or document sheet passing through a certain point by providing a suitable signal in response to the sheet. Typically, the optical sensor includes a light source whose light beam is directed at the position at which the sheet is to be sensed. A light sensitive transducer, for example a phototransistor or photodiode, is mounted in an aligned relationship with the light source, to receive either direct or reflected light from the light source.

A recurring problem in reproduction machines is the contamination of optical sensors, particularly those in the paper path, by airborne toner particles, paper fibers, carrier particles, and other contaminants. These contaminants generally cause failure by coating the optical elements, thereby greatly reducing the illumination level detected at the sensor. An additional problem is the potential for misalignment of the sensor which may also result in reduced illumination of the sensor, potentially resulting in false or erratic detection when the sensor is vibrated or otherwise perturbed, even when a copy sheet is not present.

One solution to these problems is to schedule frequent preventative maintenance periods to clean the sensors and to test the level of performance. However, this can be very costly in terms of personnel and increased down time of the machine.

Yet another potential problem for optical sensors is the degradation of the sensors through aging of the light source, producing a corresponding decrease in light output in the sensing region.

Heretofore, sensor degradation problems have been recognized and methods for correcting or allowing for the degraded performance have been proposed, some of which are found in the following disclosures which may be relevant:

U.S. Pat. No. 3,789,215, Patentee: Penny, Issued: Jan. 29, 1974.

U.S. Pat. No. 3,836,248, Patentee: John, Jr., Issued: Sep. 17, 1974.

U.S. Pat. No. 4,046,469, Patentee: Frank et al., Issued: Sep. 6, 1977.

U.S. Pat. No. 4,097,731, Patentee: Krause et al., Issued: Jun. 27, 1978.

U.S. Pat. No. 4,097,732, Patentee: Krause et al., Issued Jun. 27, 1978.

U.S. Pat. No. 4,310,153, Patentee: Kikucki, Issued: Jan. 12, 1982.

U.S. Pat. No. 4,365,151, Patentee: Fasig et al., Issued: Dec. 21, 1982.

U.S. Pat. No. 4,520,270, Patentee: Enter et al., Issued: May 28, 1985.

U.S. Pat. No. 4,577,096, Patentee: Beery et al., Issued: Mar. 18, 1986.

U.S. Pat. No. 4,670,647, Patentee: Hubble, III et al., Issued: Jun. 2, 1987.

U.S. Pat. No. 4,740,686, Patentee: Nusser, Issued: Apr. 26, 1988.

U.S. Pat. No. 4,818,132, Patentee: Brull et al., Issued: Apr. 4, 1989.

U.S. Pat. No. 5,008,532, Patentee: Ono et al., Issued: Apr. 16, 1991.

*Document Sensor*, Xerox Disclosure Journal, Vol. 7, No. 1, January/February 1982.

*Paper Edge Sensor*, IBM Technical Disclosure Bulletin, Vol. 23, No. 7A, December 1980.

*Optical Sensor Output Amplifier*, IBM Technical Disclosure Bulletin, Vol. 24, No. 3, August 1981.

The relevant portions of the foregoing patents and disclosures may be briefly summarized as follows:

U.S. Pat. No. 3,789,215 discloses a photosensitive circuit used for the detection of document sheets passing a counting station. The document detecting circuit further includes means for adjusting the document detecting threshold, relative to a peak output signal, in order to compensate for multiple documents or long term variation in the light source.

U.S. Pat. No. 3,836,248 teaches an optical sensor employing a plurality of sensors, whereby detection is determined using signals generated by a bridge circuit to balance the output of a sensor which always has light impinging on it and a second sensor having light transmitted through a document sensing region. The bridge circuit generates a signal when it becomes unbalanced due to the presence of a document in the document sensing region, thereby enabling the detection of translucent paper stock.

U.S. Pat. No. 4,046,469 describes a photocopy machine having a paper cut-off sensor. The sensor is a reflective-type optical sensor utilizing an infrared light source modulated at a predetermined frequency. False detection of the sheet is avoided by sensing the modulation of the emitted light.

U.S. Pat. Nos. 4,097,731 4,097,732 teach a sensor for regulating the intensity of the sensor light source to compensate for extraneous factors in the operating environment such as dust accumulation, component aging and misalignment. However, this type of compensation, adjusting the power output of the lamp is often relatively expensive, due to the feedback circuitry required, and generally provides only a limited degree of adjustment.

U.S. Pat. No. 4,310,153 discloses plural optical sensors in an electrostatographic system whereby the sensors are systematically activated, in response to a timing signal, to determine the presence of a sheet in accordance with the anticipated travel of the sheet.

U.S. Pat. No. 4,365,151 describes a sensor for a document processor having a reflective type sensor. The path of the light reflected from a cylindrical surface, versus the light reflected from the paper surface is sufficiently different to cause the reflected light to miss the detector when a paper sheet is present, thus generating a signal sufficient to indicate the presence of the paper.

U.S. Pat. No. 4,520,270 teaches a circuit for self-adjusting the sensitivity of a sensor. Calibration of each sensor is conducted independently by varying the voltage supplied to a comparator. Specifically, by applying the sensor output to one input of the comparator, and a reference voltage, generated as an output of a digital-to-analog converter, to the other input, the sensor open and sensor closed potentials can be determined.

U.S. Pat. No. 4,577,096, assigned to Xerox Corporation, discloses a photodetector employing a resistor-capacitor (RC) network where a feedback loop provides an increase in power whenever the transmissibility of the sensor changes. In addition, an operational amplifier may be set to provide a signal when an excessive amount of power is needed to drive the lamp at a level detectable by the phototransistor.

U.S. Pat. No. 4,670,647, assigned to Xerox Corporation and hereby incorporated by reference for its teachings, describes a dirt insensitive optical paper path sensor. The self-adjusting document sensor compensates for any degradation in the sensor system by feeding the output of the detector into an amplifier having a variable gain. The amplifier gain is controlled by a feedback signal generated as a function of the amount of deviation from a reference signal.

U.S. Pat. No. 4,740,686 teaches an improved sensor circuit suitable for reducing the current required to operate the sensor in a standby condition.

U.S. Pat. No. 4,818,132 describes a reflective-type optical sensor which bridges a paper path to detect the presence of a slip sheet. A non-reflecting brush, opposed to the sensor face, serves the dual purpose of cleaning the sensor face and covering the face to prevent false detection when the sheet is not present.

U.S. Pat. No. 5,008,532 discloses the use of a programmable attenuator in the feedback circuit which conditions the output signal of the photoelectric sensor. Also included in the feedback circuit are a pair of switchable resistors ($R_{11}$ and $R_{12}$), used to control the feedback circuit, thereby providing two ranges for the attenuator.

The Xerox Corporation and IBM Corp. disclosures describe various circuits used to implement paper and edge sensing with optical sensors.

In accordance with the present invention, there is provided an an optical sensor having an alterable sensitivity. The sensor has a light source for emitting light and a detector, disposed in aligned relationship with the light source, for producing a first output signal level in response to light having an illumination intensity greater than or equal to a threshold intensity, and a second output signal level in response to light having an illumination intensity less than a threshold intensity. The sensor also includes means, associated with the light source, for selectively altering the illumination intensity of the light emitted by the sensor. The illumination intensity is alterable between a first intensity which is greater than the detector threshold intensity and a second intensity which is greater than the detector threshold intensity and less than the first intensity, thereby altering the sensitivity of the sensor as a function of the selected illumination intensity.

In accordance with another aspect of the present invention, there is provided a sheet transport apparatus having sheet transport rolls, sheet guides, and an optical sheet sensor. The optical sheet sensor includes a light source and a photodetector, disposed in aligned relationship with the light source, for producing a first signal level indicating detection of light emitted by the light source when the sheet is not present and a second signal level indicating no detection of the emitted light when the sheet is present. The apparatus also includes means, associated with the light source, for regulating the intensity of the light impinging upon the photodetector as a function of a predetermined sheet transmissivity.

In accordance with yet another aspect of the present invention, there is provided an apparatus, disposed within an electrophotographic printing system having a document transporting mechanism associated therewith, to recognize when an optical document sensor within the document transporting mechanism is operating in a degraded condition. The apparatus includes an optical document sensor having a variable intensity light source and a photodetector disposed in aligned relationship with one another, where the intensity of the light varies as a function of an electrical current which powers the light source and where the photodetector is responsive to the light intensity produced by the light source. The apparatus also includes means, responsive to a mode selection signal, for switching the amount of current supplied to the light source between a first current level and a second current level lower in magnitude than the first current level, and control means, connected to the switching means. The control means comprises means for producing the mode selection signal to cause the current switching means to produce the lower current level, and means, connected to the photodetector, for monitoring an output signal produced by the photodetector during the lower current mode to determine if the output signal is less than a predetermined minimum level, and if so, indicating that the document sensor is operating in a degraded condition.

In accordance with another aspect of the present invention, there is provided a method of altering the sensitivity of an optical sheet sensor in order to sense a translucent sheet present within a sheet sensing region. The sensor has a light source disposed in aligned relationship with a photodetector to form the sheet sensing region therebetween. The method comprises the steps of determining that a translucent sheet is to be sensed by the optical sheet sensor, and decreasing, in response to determining the presence of the translucent sheet, the intensity of the light transferred from the light source to the photodetector and thereby increasing the sensitivity of the optical sheet sensor.

In accordance with yet another aspect of the present invention, there is provided a method of determining when an optical sensor, having a light source and a photodetector disposed in an aligned, light receiving relationship with one another, is operating in a degraded condition. The method includes the steps of: 1) reducing the intensity of the light received by the photodetector to a low illumination intensity below the normal operating intensity yet above the photodetector threshold intensity; 2) testing an output signal produced by the photodetector to determine if the photodetector is responsive to light emitted at the low illumination intensity; and if not, 3) identifying the sensor as operating in a degraded condition.

BRIEF DESCRIPTION OF THE DRAWINGS

FIG. 3 is a flowchart illustrating the basic steps used to test the operation of the sensors in accordance with the present invention;

FIGS. 4A and 4B are flowcharts illustrating the steps used to enable the sensors to detect translucent document substrates in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 5:
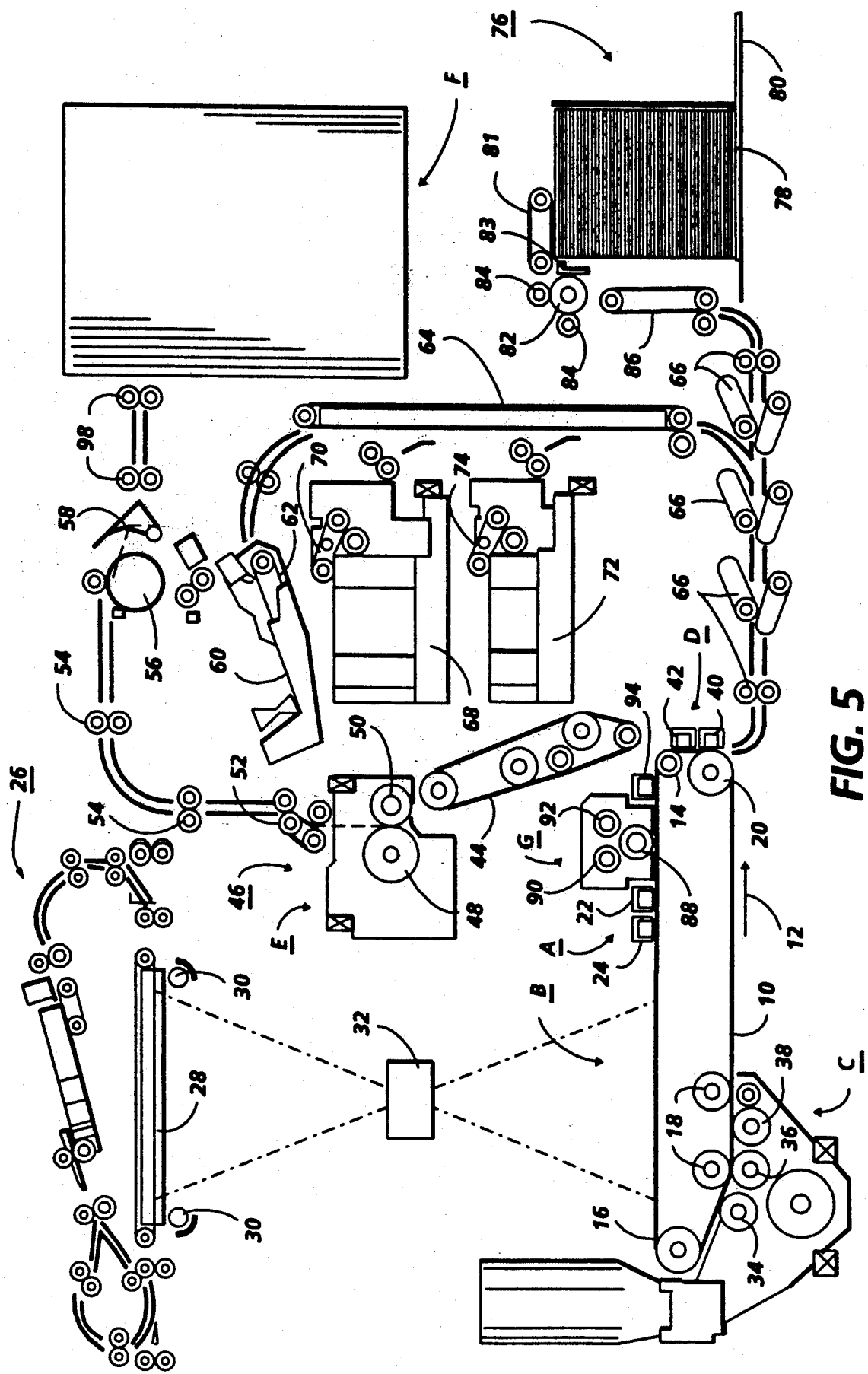
FIG. 5 is a schematic elevational view depicting an illustrative electrophotographic printing machine incorporating the document handler of FIG. 1 therein.

For a general understanding of the features of the present invention, reference is made to the drawings. In the drawings, like reference numerals have been used throughout to identify identical elements. FIG. 5 depicts, schematically, an electrophotographic printing machine incorporating the features of the present invention therein.

Referring to FIG. 5, the electrophotographic printing machine employs a photoconductive belt 10. Preferably, the photoconductive belt 10 is made from a commonly known photoconductive material coated on a ground layer, which, in turn, is coated on a known anti-curl backing layer. Belt 10 moves in the direction of arrow 12 to advance successive portions of the photoconductive surface sequentially through the various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface of belt 10 passes through charging station A. At charging station A, two corona generating devices, indicated generally by the reference numerals 22 and 24, charge photoconductive belt 10 to a relatively high, substantially uniform potential.

Next, the charged portion of the photoconductive surface is advanced through imaging station B. At imaging station B, a document handling unit, indicated generally by reference numeral 26, is positioned over platen 28 of the printing machine. Document handling unit 26 sequentially feeds original documents from a stack of documents to platen 28 where they are imaged. After imaging, the original document is fed from platen 28 and back to the top of the stack of original documents.

Figure 1:
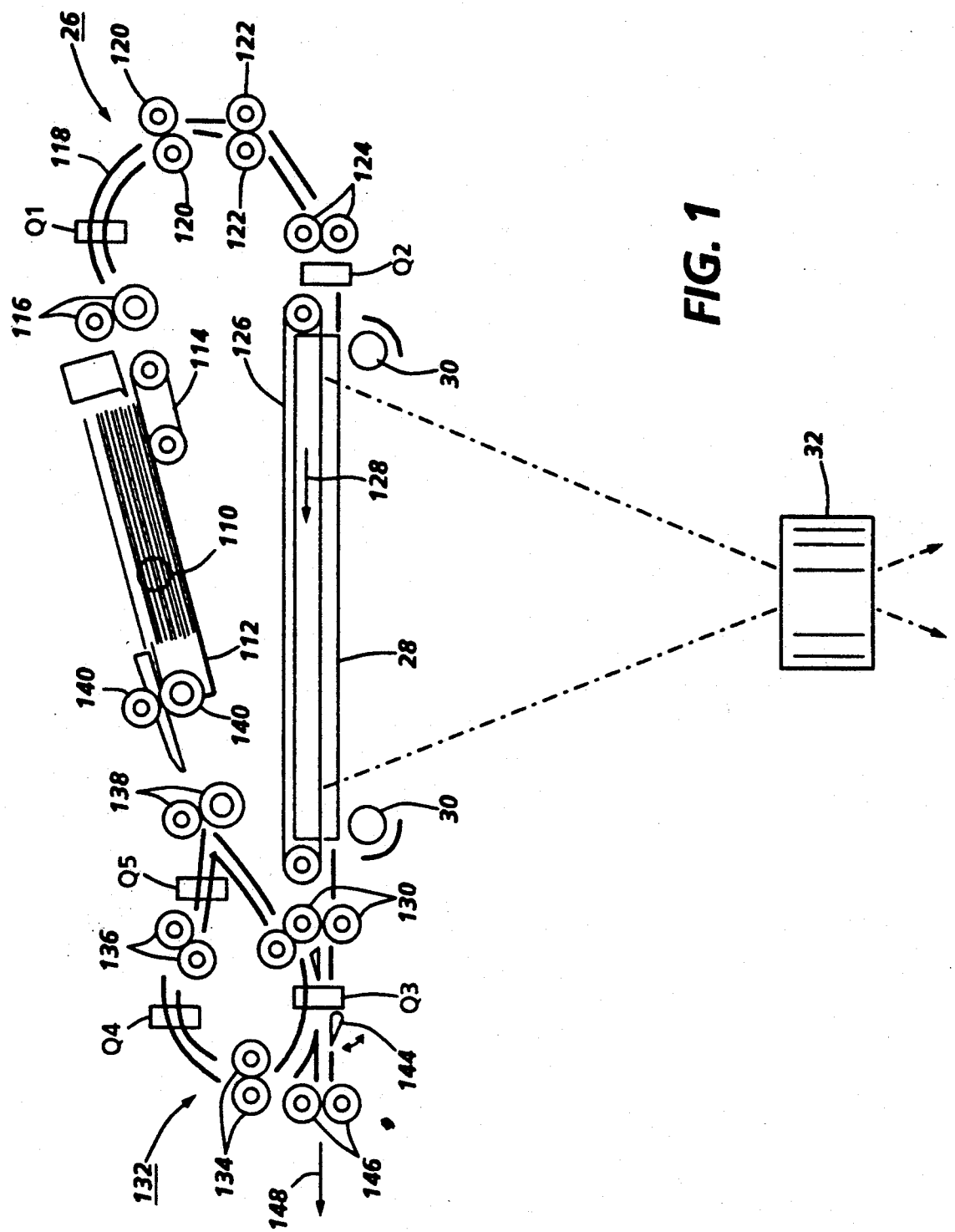
FIG. 1 is a schematic elevational view showing a recirculating document handler incorporating the present invention therein.

Imaging of a document is accomplished by lamps 30 which illuminate the document on platen 28, to achieve the selective dissipation of the charge on the surface of photoconductive belt 10 and to produce an electrostatic latent image, as will be further described with respect to FIG. 1. Thereafter, belt 10 advances the electrostatic latent image recorded thereon to development station C.

Development station C has three magnetic brush developer rolls, indicated generally by the reference numerals 34, 36 and 38. A paddle wheel picks up developer material and delivers it to the developer rolls. When developer material reaches rolls 34 and 36, it is magnetically split between the rolls. Photoconductive belt 10 is partially wrapped about rolls 34 and 36 to form extended development zones, where the latent image attracts toner particles from the carrier granules of the developer material to form a toner powder image on the photoconductive surface of belt 10. Developer roll 38 is a cleanup roll. A magnetic roll, positioned after developer roll 38, in the direction of arrow 12, is a carrier granule removal device adapted to remove any carrier granules adhering to belt 10. Belt 10 then advances the toner powder image to transfer station D.

At transfer station D, a copy sheet is moved into contact with the toner powder image. First, photoconductive belt 10 is exposed to a pretransfer light from a lamp (not shown) to reduce the attraction between photoconductive belt 10 and the toner powder image. Next, corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly, indicated generally by reference numeral 46, which permanently affixes the transferred toner powder image to the copy sheet. Preferably, fuser assembly 46 includes a heated fuser roller 48, heated internally by a quartz lamp, and a pressure roller 50 with the powder image on the copy sheet contacting fuser roller 48. The pressure roller is cammed against the fuser roller to provide the necessary pressure to fix the toner powder image to the copy sheet. Release agent, stored in a reservoir, is pumped to a metering roll. A trim blade trims off the excess release agent. The release agent transfers to a donor roll and then to the fuser roll. After fusing, the copy sheets are fed through a decurler, 52, which bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to finishing station F or to duplex tray 60. At finishing station F, copy sheets are stacked in compiler trays to form sets of copy sheets, where the sheets of each set may be stapled to one another. The sets of copy sheets are delivered to a stacker. In the stacker, each set of copy sheets is offset from an adjacent set of copy sheets. Further finishing operations known in the electrophotographic arts, such as stitching, may also be accomplished at finishing station F.

With continued reference to FIG. 5, when duplex solenoid gate 58 diverts the sheet into duplex tray 60. Duplex tray 60 provides an intermediate or buffer storage for those sheets that have been printed on one side and on which an image will be subsequently printed on the second, opposed side thereof, i.e. the sheets being duplexed. The sheets are stacked in duplex tray 60 face down on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are also fed to transfer station D from the secondary trays 68 and 72, both of which have elevators driven by a bidirectional AC motor. When the trays are in the down position, stacks of copy sheets are loaded thereon or unloaded therefrom. In the up position, successive copy sheets may be fed therefrom by top sheet feeders 70 and 74, respectively. Sheet feeders 70 and 74 are friction retard feeders utilizing feed belts and take-away rolls to advance successive copy sheets to transport 64 which advances the sheets to rolls 66 and then to transfer station D.

High capacity feeder 76 is the primary source of copy sheets, and includes a tray 78 supported on an elevator 80. The elevator is also driven by a bidirectional AC motor to move the tray up or down. In the up position, the copy sheets are advanced from the tray to transfer station D. A fluffer and air knife 83 direct air onto the stack of copy sheets on tray 78 to separate the uppermost sheet from the stack of copy sheets. A vacuum pulls the uppermost sheet against feed belt 81. Feed belt 81 feeds successive uppermost sheets from the stack to take-away drive roll 82 and idler rolls 84. The drive roll and idler rolls guide the sheet onto transport 86. Transport 86 advances the sheet to rolls 66 which, in turn, move the sheet to transfer station station D. During all phases of copy sheet transport, the position of the sheet may be monitored with transmissive- or reflective-type optical sensors as will hereinafter be described with respect to the recirculating document handler depicted in FIG. 1. However, the method and apparatus of selectively altering the sensitivity of such optical sensors, would be equally applicable to sensors within the copy sheet transport paths of an electrophotographic printing machine.

After transfer, photoconductive belt 10 passes beneath corona generating device 94 which charges any residual toner particles adhering thereto to a proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls 90 and 92, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), to be transported out of the rear of cleaning station G.

The various machine functions are regulated by a controller which, for example, includes one or more programmable microprocessors or microcontrollers in communication with one another. The controller regulates all of the machine functions hereinbefore described. The controller further provides a comparison count of the copy sheets, the number and type of documents being recirculated, the number of copy sheets selected by the operator, time delays, jam corrections, etc. The control of all of the exemplary systems heretofore described may be accomplished by conventional control switch inputs from the printing machine consoles selected by the operator. Moreover, optical sheet path sensors or switches may be utilized to keep track of the position of the documents and copy sheets as they travel through the various stations of the machine. In addition, the controller regulates the various positions of the gates depending upon the mode of operation selected.

Referring now to FIG. 1, the general operation of a recirculating document handler, 26, as commonly found within an electrophotographic printing machine, will be described. Document handling unit 26 sequentially feeds original documents from a stack of documents, 110, placed by an operator face up in a normal forward collated order in the document stacking and holding tray, 112. A document feeder, 114 located below the tray forwards the bottom document in the stack to a pair of take-away rollers 116. The bottom sheet is then fed by the take-away rollers through document guide 118, past optical sensor Q1, to feed roll pairs 120 and 122.

During the advancement of the document sheet, the output of the optical sensors, such as sensor Q1, are interrogated by a controller utilized to regulate the operation of the document handler. The controller may be any commonly known microcontroller, and will first assure that the lead edge of the document has reached Q1 and second, that the trail edge has passed Q1 as the sheet is further advanced. If the appropriate transitions in the signal output by sensor Q1 are not detected, the controller will determine that a jam or sheet transport fault has occurred. Subsequently, prior to entering the exposure position on platen 28, the sheet passes through feed roll pair 124 and optical sensor Q2. At this time the lead edge of the sheet is detected by Q2 and is frictionally engaged by belt 126, which moves across the surface of platen 28 in the direction indicated by arrow 128. Control of the position of the document sheet as it is advanced to platen 28 is accomplished by monitoring output signals from sensors Q1 and Q2, which provide signal transitions upon the presence of the document sheet within a sensing station defined by the optical axis of the sensor.

Sensors Q1 through Q5, inclusive, may be any suitable transmissive- or reflective-type optical sensors having a light emitting diode (LED) for emitting a radiant light beam of an intensity controllable as a function of the current supplied to the LED. Preferably, the optical sensors are optoelectronic transmissive channel sensors consisting of gallium-arsenide (infrared) LEDs which are optically coupled, along an optical axis extending through an open air gap, to phototransistive detectors. A typical input current to the LED is on the order of 25 milliamps, producing a forward voltage of approximately 1.8 volts across the LED. Similarly, the sensor may be reflective-type sensors which utilize a reflective surface, such as a mirror, to reflect the light from the LED to the phototransistor. Similar to the transmissive-type sensors, the lack of a reflected light beam at the phototransistor of the reflective-type sensors is also intended to indicate the presence of a document sheet.

Once advanced to the imaging platen, the document sheet is imaged by lamps 30 which illuminate the document on platen 28. Light rays reflected from the document are transmitted through lens 32. Lens 32 may directly focus the light image of the original document onto a charged portion of the photoconductive belt to selectively dissipate the charge thereon. This records an electrostatic latent image on the photoconductive belt which corresponds to the informational areas contained within the original document. Alternatively, lens 32 may focus the light image of the original document on an electronic scanning device, for example, a charge coupled device (CCD), which converts the light rays reflected from the surface of the original document into a plurality of electrical signals. Once scanned or imaged by the CCD, the signals representing the original document may be stored in a suitable memory (not shown). Subsequently, the stored electrical signals may be used to modulate a raster output device, such as a scanning laser or page-width array of light-emitting diodes, to achieve the selective dissipation of the charge on the surface of the photoconductive belt. Thereafter, belt 126 advances the document completely across platen 28 into guide and feed roll pair 130.

The document may then advance into inverter mechanism 132, passing feed roll pairs 134 and 136, and sensors Q4 and Q5, to continue back to the top of the stack of original documents through feed roll pair 138 and exit rolls 140. Similarly, if gate 144 is open, the document may proceed through the pair of feed rolls 146, in the direction indicated by arrow 148, to a side exit of the document handler. Once again, the movement of the document would be monitored by sensors Q3, Q4 and Q5 as previously described with respect to sensors Q1 and Q2.

Alternatively, in the case of duplexed original documents, the document sheet would be fed from platen 28 through feed roll pairs 130, 134 and 136 until the trail edge of the document reached sensor Q3. Upon detecting the trail edge of the document sheet the microcontroller would cause the sheet travel direction to be reversed, by reversing the rotation of the feed rolls, to transport the document back to the top of the stack of original documents through the feed roll pair 138 and exit rolls 140 in an inverted condition. After imaging of the duplex side of the document, it would be inverted once again, as previously described, to return it to its original orientation.

Figure 2:
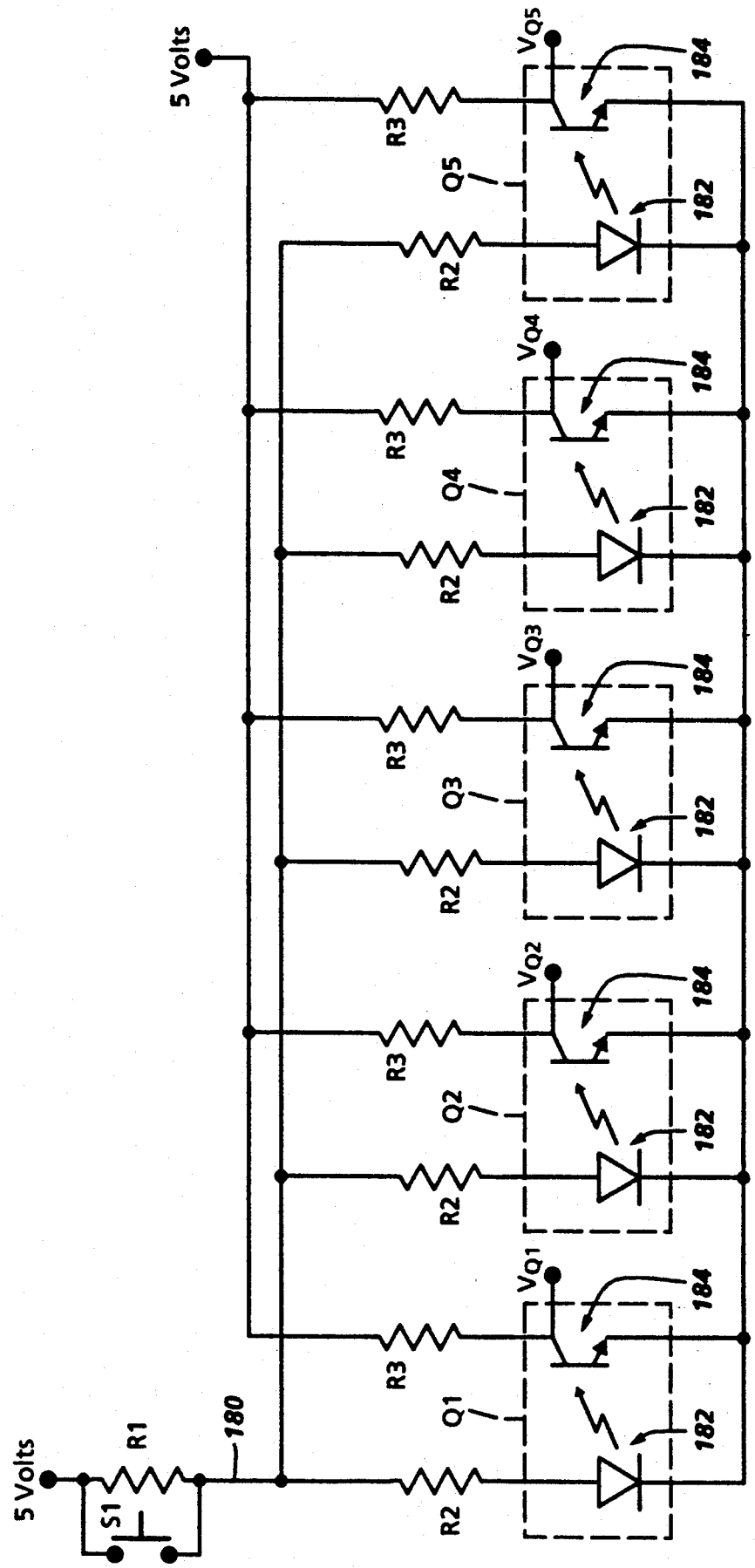
FIG. 2 is an electrical schematic diagram illustrating an embodiment of the present invention for the sensors depicted in FIG. 1.

Referring next to FIG. 2, which schematically illustrates the electrical circuitry associated with the optical sensors, it can be seen that separate 5 volt power lines are employed to drive the LEDs and phototransistors of the sensors. More specifically, the present invention utilizes a single, variable current line 180 to provide power to the LEDs, 182, of sensors Q1 through Q5. Each LED commonly employs a current limiting resistor R2, having a resistance of approximately 120 ohms, in the input power line. Similarly, the photoresponsive transistors (phototransistors) 184 utilize resistors R3 to limit the current supplied to the collector. Resistors R3 typically have a resistance in the range of about 10K ohms. As a function of the illumination intensity from LEDs 182, phototransistors 184 produce an output $V_{QN}$ (where N corresponds to the sensor number). Hence, when sufficient light strikes the photoresponsive detector region of phototransistor 184 current passes through the transistor, from the collector to the emitter, resulting in a lower voltage at $V_{QN}$. Typically the voltage at $V_{QN}$ will be in the range of about 0.8 volts, representing the saturated collector-emitter voltage of the phototransistor. On the other hand, when the illumination from LED 182 decreases, $V_{QN}$ increases until the illumination is insufficient to generate a response in phototransistor 184, at which time $V_{QN}$ will equal the 5 volt supply level.

Utilizing the described response of the phototransistors, the present invention is designed to purposely reduce the illumination produced by LEDs 182 in order to detect degraded or misaligned sensors, or to increase the sensitivity of the sensors and thereby detection of translucent documents or vellum sheets. More specifically, the present invention automatically opens and closes switch S1 in order to selectively insert resistor R1 into the power supply circuit for the LEDs. As a result of opening switch S1, resistor R1, in the range of about 27 ohms, is inserted into the power supply circuitry to reduce the driving current to the LED by approximately fifty percent. Similarly, the intensity of the infrared illumination produced by the LED will decrease. In response to the decreased LED output illumination intensity, the detector of phototransistor 184 may not receive sufficient illumination to cause it to conduct current from the collector to the emitter.

Numerous alternate embodiments exist to reduce the intensity level of the infrared light which reaches the phototransistor. For example, the voltage potential applied to the LED power circuit could be reduced to a level less than 5 volts to achieve a similar reduction in the amount of driving current provided to the LEDs. Mechanical means also exist to reduce the intensity of the infrared light which reaches the phototransistor, for example, a mechanical shutter arrangement which could be inserted into the optical axis of the sensors, where the shutter material is a semitransparent film suitable for reducing the intensity of the infrared light transmitted therethrough.

As illustrated in the flowchart of FIG. 3, the selective insertion of resistor R1 may be used to test or check the performance of the sensor, as executed by sensor check routine 210. At step 212, switch S1 is opened to reduce the current supplied to the LEDs. Subsequently, at step 214, the collector voltages ($V_{Qn}$) are once again sampled, with any sensors having high voltages being declared as marginally operational or faulty as indicated by step 216. Then, after re-closing switch S1, step 218, to return the sensors to their "normal" operating condition, control is returned at step 220. While the detection of a marginally operational sensor will not result in a shutdown of the operation of the machine or the recirculating document handler, the information may be stored in nonvolatile memory or reported to a service organization through remote interactive communications with a host computer. Then at a later time, the service technician will be made aware of the problem and the sensor can either be cleaned, readjusted, or replaced as necessary.

Referring next to the flowcharts of FIGS. 4A and 4B, the use of the present invention to enable position monitoring of translucent sheets such as vellum stock will be described. Assuming that the operator has indicated the use of vellum stock originals, as indicated by an affirmative response at step 230, vellum enablement routine 232 is entered. In order to increase the sensitivity of sensors Q1 through Q5, thereby making them more responsive to translucent documents, step 234 opens switch S1 to decrease the power supplied to the LEDs. Subsequently, a flag is set in system memory, step 236, to indicate that the vellum routine has opened the switch, and control is returned to continue the aforedescribed operation of the document handler. At some later time, when execution of a copying operation has been completed, test 250 determines if the vellum flag has been set, indicating that switch S1 is open. If so, the cancel vellum enablement routine, 252 is entered to reset the sensors and flag to indicate normal operating conditions. Specifically, step 254 closes switch S1 to remove the additional resistance of R1, while step 256 clears the vellum flag to indicate that the sensor LEDs are again operating at their normal, full power level. As previously described, the reduced light intensity from the LEDs would improve the sensitivity of sensors Q1 through Q5, making them more likely to respond to the presence of a document having a high transmissivity and thereby enabling the document handler to successfully transport vellum or similarly translucent documents.

In recapitulation, the present invention is a method and apparatus for selectively decreasing the intensity of light emitted from an optical sensor, thereby increasing the sensitivity of the sensor. The increased sensitivity so produced renders the sensor suitable for use with translucent materials. Moreover, the increased sensitivity renders any sensor previously having marginal operating characteristics identifiable via simple interrogation of the sensor output during the period of reduced light intensity.

It is, therefore, apparent that there has been provided, in accordance with the present invention, a method and apparatus for improving the sensitivity of an optical sensor. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An optical sheet sensing apparatus having a selectable sensitivity which is alterable during use thereof, comprising:
   a light source for emitting light;
   a detector, disposed in a light receiving relationship with the light source, for producing a first output signal level in response to light having an illumination intensity at least equal to a threshold intensity, and a second output signal level in response to light having an illumination intensity less than the threshold intensity; and
   means, associated with said light source, for selectively altering the illumination intensity of the emitted light during the use of the optical sheet sensing apparatus between a first intensity greater than the detector threshold intensity and a second intensity greater than the detector threshold intensity and less than the first intensity, thereby altering the sensitivity of the sheet sensing apparatus as a function of the selected illumination intensity.

2. The apparatus of claim 1, further comprising a voltage source, coupled to said light source, for supplying electrical current to said light source with the illumination intensity of the emitted light being a function of the magnitude of the electrical current supplied thereto, where said illumination altering means comprises switching means coupled to said voltage source and said light source.

3. The apparatus of claim 2, wherein said switching means comprises:
   a resistor; and
   a switch adapted to connect and disconnect said resistor, in
   a switch adapted to connect and disconnect said resistor, in series, to said voltage source and said light source, thereby altering the current supplied to said light source when said resistor is connected, in series, between said voltage source and said light source.

4. The apparatus of claim 2, wherein said illumination intensity altering means further comprises a variable resistor, responsive to said switching means and connecting, in series, said voltage source with said light source, for modifying the series resistance therebetween, thereby altering the current supplied to the light source whenever the resistance is modified.

5. The apparatus of claim 1, wherein said illumination altering means comprises a power supply, coupled to said light source and having a switchable output potential, wherein a switch in the output potential results in a corresponding alteration of the current supplied to said light source.

6. The apparatus of claim 1, wherein said illumination altering means comprises a semi-transparent shutter adapted to be selectively inserted in the light path between said light source and said detector to selectively alter the intensity of the light which illuminates said detector.

7. The apparatus of claim 1, wherein said light source and said detector are aligned along a common optical axis, thereby forming a transmissive-type optical sensor.

8. The apparatus of claim 1, further including a reflective surface adapted to reflect the emitted light toward said detector, with said light source and said detector being positioned with respect to said reflective surface to form a reflective-type optical sensor.

9. The apparatus of claim 1, wherein said light source comprises an infrared light emitting diode, and said detector comprises a phototransistor sensitive to infrared light.

10. A sheet transport apparatus comprising:
    a plurality of optical sheet sensors, each sensor including,
        a light source, and
        a detector, disposed in a light receiving relationship with said light source, for producing a first signal level responsive to light detected in the absence of the sheet, and a second signal level responsive to light detected in the presence of the sheet; and
    means, associated with the light source for each of said optical sheet sensors, for regulating the intensity of the light emitted therefrom as a function of a predetermined sheet transmissivity.

11. The sheet transport apparatus of claim 10, further comprising a voltage source, coupled to the light source for each of said optical sheet sensors, for supplying electrical current to said light sources with the illumination intensity of the emitted light being a function of the magnitude of the electrical current supplied thereto, and where said regulating means comprises switching means coupled to said voltage source and said light sources.

12. The sheet transport apparatus of claim 11, wherein said switching means comprises:
    a resistor; and
    a switch adapted to connect and disconnect said resistor, in series, to said voltage source and said light sources, thereby altering the current supplied to said light sources when said resistor is connected, in series, between said voltage source and said light sources.

13. The sheet transport apparatus of claim 11, further including a resistor connecting, in series, said voltage source with said light sources, wherein said switching means comprises a variable resistor connected to said resistor for modifying the series resistance, thereby altering the current supplied to said light sources whenever the resistance therebetween is modified.

14. The sheet transport apparatus of claim 10, wherein said regulating means comprises a power supply, coupled to said light sources having a switchable output potential, wherein a switch in the output potential results in a corresponding alteration of the current supplied to said light sources.

15. An apparatus, disposed within an electrophotographic printing system, for recognizing when a sheet sensor, positioned along a sheet path, is operating in a degraded condition, comprising:
   an optical sensor having a variable intensity light source;
   a photodetector disposed in a light receiving relationship with said light source;
   a voltage source, coupled to said light source, for supplying electrical current to said light source, whereby the intensity of the light emitted therefrom varies as a function of the electrical current supplied thereto, said photodetector being responsive to the intensity of the light emitted from the light source;
   means for generating a mode selection signal;
   means, responsive to the mode selection signal, for switching the amount of current supplied to said light source between a first current level, which causes the light source to emit light of a first intensity greater than a threshold intensity of said photodetector, and a second current level lower in magnitude than the first current level, which causes the light source to emit light of an intensity greater than the threshold intensity yet less than the first intensity, said switching means producing the second current level in response to the mode selection signal; and
   means, connected to said photodetector, for monitoring an output signal produced by the photodetector when the switching means supplies current at the second level to determine if the output signal is greater than a predetermined level, and, in response thereto, indicating that the sensor is operating in a degraded condition.

16. The apparatus of claim 15, wherein said switching means comprises:
   a resistor; and
   a switch adapted to connect and disconnect the resistor, in series, to the voltage source and the light source thereby altering the current supplied to the light source when the resistor is connected, in series, between the voltage source and the light source.

17. The apparatus of claim 15, wherein said switching means comprises a variable resistor, responsive to the mode selection signal and connecting, in series, said voltage source with said light source, for modifying the series resistance therebetween, thereby altering the current supplied to the light source whenever the resistance is modified.

18. An apparatus, disposed within an electrophotographic printing system, for recognizing when a sheet sensor, positioned along a sheet path, is operating in a degraded condition, comprising:
   an optical sensor having a light source and a photodetector disposed in a light receiving relationship with said light source, where said photodetector is responsive to the intensity of the emitted light which illuminates the photodetector;
   means for generating a mode selection signal;
   means, responsive to the mode selection signal, for inserting a semi-transparent shutter in the light path between said light source and said photodetector to selectively decrease the intensity of the light which illuminates said photodetector; and
   means, connected to said photodetector, for monitoring an output signal produced by the photodetector during a decreased illumination intensity mode to determine if the output signal is greater than a predetermined level, and, in response thereto, indicating that the sensor is operating in a degraded condition.

19. A method of altering the sensitivity of an optical sheet sensor so as to allow such a sensor to alternatively detect both opaque and translucent sheets, said sensor having a light source disposed in a light receiving relationship with a photodetector to form a sheet detecting region therebetween, comprising the steps of:
   operating the light source of the optical sheet sensor at a first intensity greater than a threshold intensity of the photodetector so as to allow the sensor to detect opaque sheets passing through the sheet detecting region;
   determining that a translucent sheet is to be sensed by the optical sheet sensor; and
   decreasing, in response to said determining step, the intensity of the light transmitted to the photodetector from the light source to an intensity less than the first intensity yet greater than the photodetector threshold intensity, thereby increasing the sensitivity of the optical sheet sensor so as to enable detection of a translucent sheet passing through the sheet detecting region.

20. The method of claim 19 wherein said decreasing step includes the step of decreasing the power supplied to the light source.

21. The method of claim 19 wherein said decreasing step includes the step of inserting a semi-transparent filter between the light source and the photodetector to decrease the intensity of the light received by the photodetector.

22. A method of determining when an optical sensor, having a light source and a photodetector disposed in a light receiving relationship with one another, is operating in a degraded condition, comprising the steps of:
   reducing the intensity of the light received by the photodetector to a low illumination intensity, with the low illumination intensity being fixed within the range of intensities between a normal illumination intensity, at which the sensor is normally operated, and a threshold intensity of the photodetector;
   testing an output signal produced by the photodetector to determine if the photodetector is responsive to light received at the low illumination intensity; and
   identifying the sensor as operating in a degraded condition, if said testing step determines that the photodetector is not responsive to light received at the low illumination intensity.

23. The method of claim 22, further including the step of reporting the presence of the degraded optical sensor.

* * * * *